INVENTOR.
BRUCE GARDNER HOOD
BY
Russell, Chittick & Pfund
ATTORNEYS

United States Patent Office 3,124,627
Patented Mar. 10, 1964

3,124,627
MOLD FOR MOLDING POLYURETHANE FOAM AND PROCESS THEREFOR
Bruce Gardner Hood, Marblehead, Mass., assignor, by direct and mesne assignments, to Davidson Rubber Company, Inc., Dover, N.H., a corporation of New Hampshire
Filed Jan. 13, 1961, Ser. No. 82,549
3 Claims. (Cl. 264—54)

This invention relates to molds for molding resinous foam forming materials, and more particularly to a mold and a process for molding large contoured cushions, pads and the like from low density resinous foam forming materials, such as polyurethane.

In the past it has been a relatively simple task to mold polyurethane foam materials in slab form because of the uniform dimensions of the molds employed and the ease with which the molding conditions in such molds can be controlled and maintained uniformly. On the other hand, hitherto it has been extremely difficult to mold low density foam in large non-uniform shapes, while still providing adequate load bearing strength in the foam for use in, say, furniture, and at the same time make the density sufficiently low to be economically significant and physically attractive. This invention relates to the solution of this problem, and is directed to the general object of providing a mold for molding in place non-uniform or contoured cushions or the like having adequate load bearing strength for use in furniture or other similar padded elements, and in which the density of the foam is extremely low.

The problem presented by this object is complex. It involves both the solution of hitherto known, but unsolved, problems and the detection and prevention of hitherto unsuspected causes for failure. For instance, it has been known that physical disturbance at a critical point during the cure of foam will cause it to drop locally within the mold and virtually ruin the product. This is analogous to the problem of cooking a souffle in which the souffle will drop if the oven door is opened at the wrong time. However, in the case of polyurethane foam merely avoiding physical disturbance of the foam during the cure does not provide the final answer. Other factors will cause the foam to drop or fracture locally. For instance, I have found that a non-uniform exchange of heat between the foam and the mold wall, as the foam expands will result in foam fracture or collapse. Likewise, unless all parts of the foam start reacting at substantially the same time and continue at substantially the same rate, the system becomes sensitive to fracture. Other factors not germaine to the present invention also cause trouble, such as the reaction and expansion rates of the resin. If either is too fast, the system becomes sensitive to collapse or fracture, but if either is too slow, low density cannot be achieved. Likewise when the charge is placed in the mold, it should flow freely and with a relatively low viscosity so that during expansion thereafter its upper surface will be relatively flat and free of raised portions or lumps. Lumps on the surface of the foam as it expands cause internal pressure lines or fracture. Collapse and fracture, however, are not the only problems accentuated by the requirement for low density. The provision of a strong and attractive surface skin for the finished article is likewise a major problem. This is due to the fact that low density foams must produce so much gas during formation that they are extremely sensitive to high temperatures in the mold at the time of pouring, but if the mold is cool enough to avoid harmful acceleration of the reaction at the time of pouring, the foam surface does not develop properly. Hitherto, these and other aspects of the low density foam molding problem have been only vaguely appreciated and were substantially unsolved.

Accordingly, one of the more specific objects of my invention is to provide a mold for molding in place large contoured articles employing low density resinous foam forming materials under conditions adapted to avoid premature or unwanted localized foam collapse or fracture. Another object is to provide a mold adapted to provide a relatively uniform foam development and resin curing. Still another object is to provide a mold adapted for imparting a strong and attractive skin to the articles molded therein.

I accomplish these and other objects in a preferred embodiment of my invention by a combination of various features, shown more particularly in the accompanying drawings illustrating a preferred embodiment thereof in which.

Figure 1:
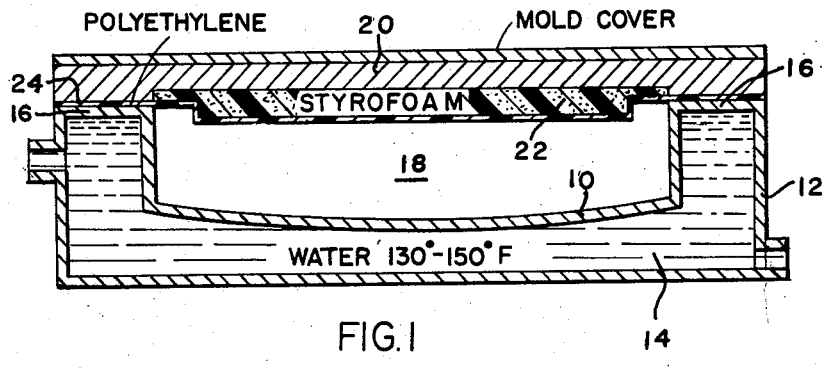
FIG. 1 is a diagrammatic view in cross section showing the mold prior to introducing the resin charge therein, and indicating the presence of water in the jacket thereof to heat the same to about 120° F. to 150° F.
Figure 2:
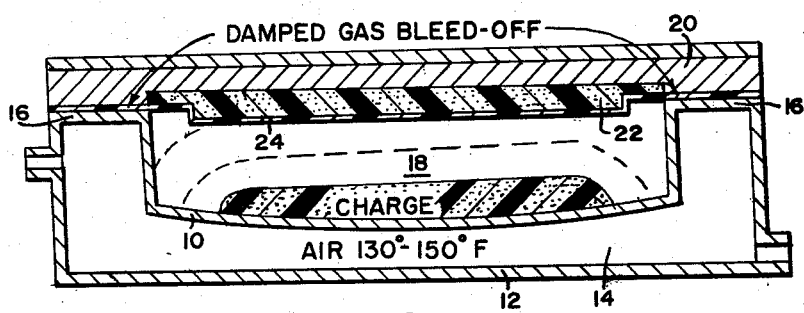
FIG. 2 is a similar diagrammatic view showing the water removed from the jacket and the resin charge in the mold.
Figure 3:
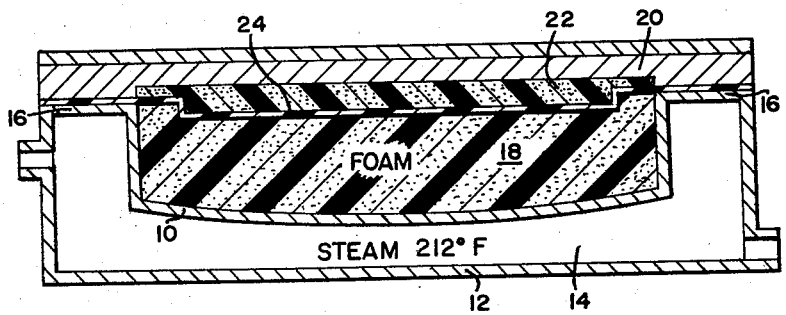
Figure 4:
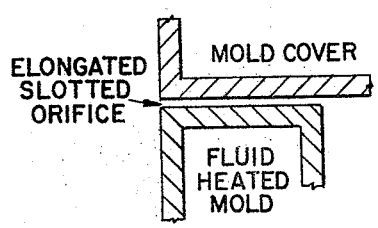

FIG. 3 is a similar diagrammatic view showing foam fully developed and indicating the presence of steam in the mold at 212° F. for finally curing the resin; and FIG. 4 is an enlarged diagrammatic view showing the elongated slotted orifice formed between the mold cover and the mold walls through which the gas is allowed to escape from the mold as the foam expands in accordance with the teachings of this invention.

The preferred embodiment of my invention herein shown comprises a mold consisting in an inner mold wall 10 surrounded by an outer mold wall 12 defining between them a jacket cavity 14. A top horizontal wall 16 joins the inner wall 10 and outer wall 12. The inner wall 10 is contoured and essentially defines within it the mold cavity indicated at 18. These walls may be of fiberglass construction or other suitable materials such as sheet metal or reinforced resins such as epoxy polyester or the like. The cover for the mold consists in a layer or two of plywood 20, laminated to a styrofoam slab 22, and the same is usually covered over with a polyethylene film 24. The cover 20 is dimensioned to fit flush over the top wall 16 of the mold jacket, and is held in place by conventional clamps not shown.

This mold is adapted particularly for one-shot urethane foam in which a relatively large amount of gas is caused to evolve and expand within the resin mass to produce a very light, open-celled foam structure.

In using materials of this type it is important to provide extremely uniform temperature conditions within the mold and simultaneously to avoid all physical disturbance of the resin until it has achieved sufficient gel strength to withstand the same. We do this by making the mold wall 10 relatively thin and controlling the temperature in the jacket 14 by water and steam. Initially the mold is heated to between about 120° F. and 150° F. by introducing water carefully heated to the desired temperature within that range. By circulating the water at that temperature through the jacket 14 the mold is brought to the desired temperature completely and uniformly. Thereafter the water is removed from the jacket after which the resin charge is introduced. At this point the mold tends to heat up the resin, but since its specific heat is relatively low because its wall is thin (⅛″ for metal or ³⁄₁₆″ for fiberglass) the effect thereof is not too drastic in accelerating the reaction thereof. Moreover since air is present in the jacket, the mold wall 10 may be considered as being fairly well insulated. Thus when the temperature of the resin rises, the temperature of the mold wall 10 also rises in fairly close succession. Also since there is no need to disturb the mold in any way in the initial stages of foam formation, the danger of collapse due to physical disturbance is virtually eliminated.

In the context shown as the foam rises to the top of the mold it contacts the polyethylene film 24 and presses gently against the styrofoam slab 22. It will be understood that the specific heat of these elements and the insulation thereof has very little effect, and also since the foam is fairly well developed and partially gelled by the time it reaches the mold top, the temperature requirements necessary for the mold top wall 20 are not so critical as for the mold wall 10.

One of the important elements of this mold which must be considered herein and which I intend to claim broadly is the provision of a wide area of contact between the mold cover 20 and the upper wall 16 of the mold jacket. This extends over a substantial distance of at least an inch or two, preferably 2½″, such that the escape of gas from the mold as the foam expands is substantially damped by the gaseous back-pressure in the elongated orifice between the two elements of the mold. Although the cover 20 is clamped in place, the clamping pressure is not so great that gas is prevented from escaping. I have found that this damping of the gas is very important in promoting a uniform rate of exhaust without flutter or fluctuation which otherwise causes the foam to collapse.

Once the foam has filled out the mold and reached a sufficient stage of gel formation to withstand physical stress, we introduce steam at 212° F. or other vapor at its vapor point into the mold for accelerating final cure of the foam. This mold is ideal for the fast application of heat to the resin charge with extreme uniformity.

Since various minor variations of this preferred embodiment of my invention will now be apparent to those skilled in the art, it is not my intention to confine the invention to the precise form shown herein, but rather to limit it in terms of the appended claims.

Having thus described and disclosed a preferred embodiment of my invention, what I claim as new and desire to secure by Letters Patent of the United States is:

1. Apparatus for molding rapidly expanding low density, soft and sensitive plastic foams comprising: mold walls defining a horizontal and essentially flat cavity; a jacket surrounding said mold; said walls being adapted for rapid transfer of heat comprising materials selected from the group consisting in sheet metal, sheet plastic, fiberglass, reinforced epoxy resins and reinforced polyester resins; a cover for said mold; first and second abutting mating substantially horizontal mold enclosure surfaces, said first surface being associated with and connected to said mold wall, said second surface being associated with and connected to said cover; said first and second surfaces defining between them an elongated slotted orifice having a width of at least 2½ inches for damping fluctuations in the rate of gas bleed-off from said mold when a thermosetting resinous foam is expanded therein; and means for maintaining said mold walls at a highly uniform temperature including heated fluid in said jacket.

2. A process for molding low density soft polyurethane foam forming materials, said process comprising; heating an essentially flat horizontal mold uniformly to an initial mold temperature, said mold having mold walls defining a horizontal and essentially flat cavity and a removable cover with the contacting surfaces of said cover and mold walls defining between them an elongated slotted orifice having a width of at least 2½ inches, placing a charge of reacting and expanding polyurethane foam forming materials in said cavity, placing said cover in place, allowing foaming of said charge to proceed without application of externally applied heat, bleeding gas from said mold while dampening fluctuations thereof through said slotted orifice, thereafter and as soon as said materials can withstand an increase of heat rapidly heating said mold uniformly to an elevated temperature.

3. The process defined in claim 2 wherein said mold is heated to said initial mold temperature by a liquid heating medium and thereafter removing said liquid heating medium from contact with said mold wall prior to placing said charge.

References Cited in the file of this patent

UNITED STATES PATENTS

| | | |
|---|---|---|
| 2,441,548 | Sperry | May 11, 1948 |
| 2,600,942 | Vanacker | June 17, 1952 |
| 2,690,987 | Jeffries et al. | Oct. 5, 1954 |
| 2,752,635 | Miller | July 3, 1956 |
| 2,770,241 | Winkler | Nov. 13, 1956 |
| 2,797,442 | Wagner | July 2, 1957 |
| 2,804,653 | Talalay | Sept. 3, 1957 |
| 2,872,706 | Jordan | Feb. 10, 1959 |
| 2,892,216 | Steel | June 30, 1959 |
| 2,938,237 | Kern et al. | May 31, 1960 |

OTHER REFERENCES

Rubber World, "Molding of Prepolymer Based Resilient Urethane Foam," vol. 139, No. 5, February 1959, pp. 685–692. (Copies in Sci. Lib.)

Plastics Engineering Handbook, Reinhold Pub. Co., 1960, pp. 179–188. (Copies in Div. 50.)

Du Pont Booklets Elastomer Chemical Dept., "Rigid Urethane Foams; Methods of Application," June 1957, pp. 3–7; "Rigid Urethane Foams, II, Chemistry and Formulation," AR–26, April 1958, pp. 41–44. (Copy in Div. 50.)